United States Patent
Yamashita et al.

(10) Patent No.: US 12,435,883 B2
(45) Date of Patent: Oct. 7, 2025

(54) HOT WATER SUPPLY DEVICE AND HOT WATER SUPPLY SYSTEM

(71) Applicant: NORITZ CORPORATION, Hyogo (JP)

(72) Inventors: Kohei Yamashita, Hyogo (JP); Shota Mizuno, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 403 days.

(21) Appl. No.: 18/185,390

(22) Filed: Mar. 17, 2023

(65) Prior Publication Data
US 2023/0332774 A1    Oct. 19, 2023

(30) Foreign Application Priority Data
Apr. 15, 2022    (JP) .................. 2022-067483

(51) Int. Cl.
*F22B 27/00*    (2006.01)
*F24D 17/00*    (2022.01)

(52) U.S. Cl.
CPC .................. *F24D 17/0078* (2013.01)

(58) Field of Classification Search
CPC .... F24D 17/0078; F22B 27/00; F22B 35/005; F24H 1/10; F24H 9/2007
See application file for complete search history.

(56) References Cited

FOREIGN PATENT DOCUMENTS

| CN | 112146285 A | * 12/2020 | ............. F24H 9/139 |
|----|-------------|-----------|------------------------|
| CN | 112833448 A | * 5/2021  | ............. F24H 9/139 |
| JP | 2021085582 A | * 6/2021 | ............... F24H 9/13 |
| JP | 2021183889 | 12/2021 | |

* cited by examiner

*Primary Examiner* — Gregory A Wilson
(74) *Attorney, Agent, or Firm* — JCIPRNET (57) ABSTRACT

A hot water supply device and a hot water supply system are provided. A controller actuates a circulation pump at a constant output and actuates a heating mechanism for heating by a combustion mechanism when an instantaneous hot water operation is started in response to a temperature drop of a fluid while hot water supply of a hot water supply tap is stopped, until a minimum drive time elapses. The minimum drive time is set based on a flow rate detection value of a flow rate detector under a condition that the circulation pump is actuated at a predetermined constant output and an instantaneous hot water circulation path is formed.

9 Claims, 7 Drawing Sheets

HOT WATER SUPPLY DEVICE AND HOT WATER SUPPLY SYSTEM

CROSS-REFERENCE TO RELATED APPLICATION

This application claims the priority benefits of Japanese application no. 2022-067483, filed on Apr. 15, 2022. The entity of the above-mentioned patent application is hereby incorporated by reference herein and made a part of this specification.

BACKGROUND

Technical Field

The disclosure relates to a hot water supply device and a hot water supply system, and more particularly to a hot water supply device and a hot water supply system having an instantaneous hot water operation function.

Related Art

One type of hot water supply device has a so-called instantaneous hot water operation function, in which hot water is output at an appropriate temperature immediately after the start of hot water supply even after hot water supply has been stopped for a long time. In order to realize instantaneous hot water operation, it is necessary to actuate the circulation pump even when hot water supply is stopped (standby) so as to form a circulation flow path through the heat source.

Japanese Patent Application No. 2021-183889 (Patent Literature 1) describes a hot water supply system in which setting of termination condition for the instantaneous hot water operation, that is, condition for turning OFF the circulation pump and turning OFF the combustion burner, is possible so as to realize the instantaneous hot water operation in ecology mode.

Specifically, according to the hot water supply system of Patent Literature 1, when the instantaneous hot water operation is executed during trial operation, a cumulative flow rate value is counted, and the counted value from the start of the instantaneous hot water operation until the detected temperature by a temperature sensor rises is obtained as the approximate value of the capacity of the circulation flow path in the instantaneous hot water operation.

Furthermore, it is recited that in the actual instantaneous hot water operation, when the cumulative flow rate value from the start of the instantaneous hot water operation reaches a termination determination value set by using the approximate value of the capacity of the circulation flow path obtained in the trial operation, the instantaneous hot water operation is terminated. In particular, Patent Literature 1 describes that the instantaneous hot water operation in the energy-saving mode is realized by setting an termination determination value smaller than (for example, ½ times) the above approximate value.

However, in Patent Literature 1, in order to set termination condition for the instantaneous hot water operation, instantaneous hot water operation needs to be executed during the trial operation, and there is a concern that the time for the trial operation will become longer. Furthermore, depending on the temperature distribution in the circulation path during the instantaneous hot water operation before the execution of the trial operation, there is a possibility that the capacity of the circulation flow path may be detected to be too small.

If the termination determination value for the measurement operation is set according to the capacity of the circulation flow path that is detected to be too small, there is a concern that the instantaneous hot water operation will be terminated in a state in which the fluid in the circulation path is insufficiently heated. On the contrary, if the termination determination value is set with a margin in order to avoid such as case, the instantaneous hot water operation will be continued even after the fluid in the entire circulation path is heated, which may result in wasteful energy consumption.

The disclosure provides a hot water supply device and a hot water supply system in which appropriate setting of termination condition for the instantaneous hot water operation is possible.

SUMMARY

In one aspect of the disclosure, a hot water supply device is provided. The hot water supply device is a hot water supply device for supplying hot water to a hot water supply destination, and includes a heating mechanism heating a fluid; an internal path; a flow rate detector; and a control device that controls the circulation pump and the heating mechanism. The internal path, in combination with an external path formed between two ports of the hot water supply device outside the hot water supply device so as not to include the hot water supply destination, forms an instantaneous hot water circulation path through which the fluid passes via the two ports and the heating mechanism in an instantaneous hot water operation executed with an actuation of a circulation pump a temperature of the fluid drops while the hot water supply is stopped at the hot water supply destination. The flow rate detector is arranged in the instantaneous hot water circulation path. When the instantaneous hot water operation is started, until a minimum drive time set based on a flow rate detection value of the flow rate detector under a condition that the circulation pump is actuated at a predetermined constant output and the hot water circulation path is formed elapses, the control device actuates the circulation at the constant output and actuates the heating mechanism.

In one aspect of the disclosure, a hot water supply system is provided. The hot water supply system includes a hot water supply device including a heating mechanism that heats a fluid; a circulation pump; an instantaneous hot water circulation path; a flow rate detector; and a control device that controls the circulation pump and the heating mechanism. The circulation pump is actuated in an instantaneous hot water operation that is executed in response to a temperature drop in the fluid while hot water supply is stopped at a hot water supply destination. An instantaneous hot water circulation pathway includes an internal pathway and an external pathway when the circulation pump is actuated. The internal path is formed between two ports of that hot water supply device such that the fluid passes through the heating mechanism inside the hot water supply device when the circulation pump is actuated. The external path is formed between the two ports and outside the hot water supply device so as not to include the hot water supply destination of the hot water supply device. The flow rate detector is arranged in the instantaneous hot water circulation path. When the instantaneous hot water operation is started, until a minimum drive time set based on a flow rate detection value of the flow rate detector under a condition that the circulation pump is actuated at a predetermined constant output and the hot water circulation path is formed elapses, the control device actuates the circulation pump actuate at the constant output and actuates the heating mechanism.

DESCRIPTION OF THE EMBODIMENTS

According to the disclosure, it is possible to provide a hot water supply device and a hot water supply system in which appropriate setting of termination condition for the instantaneous hot water operation is possible.

Below, embodiments of the disclosure will be described in detail with reference to the drawings. In the following description, the same reference numerals are given to the same or corresponding parts in the drawings, and the description thereof will not be repeated in principle.

Embodiment 1

Figure 1:
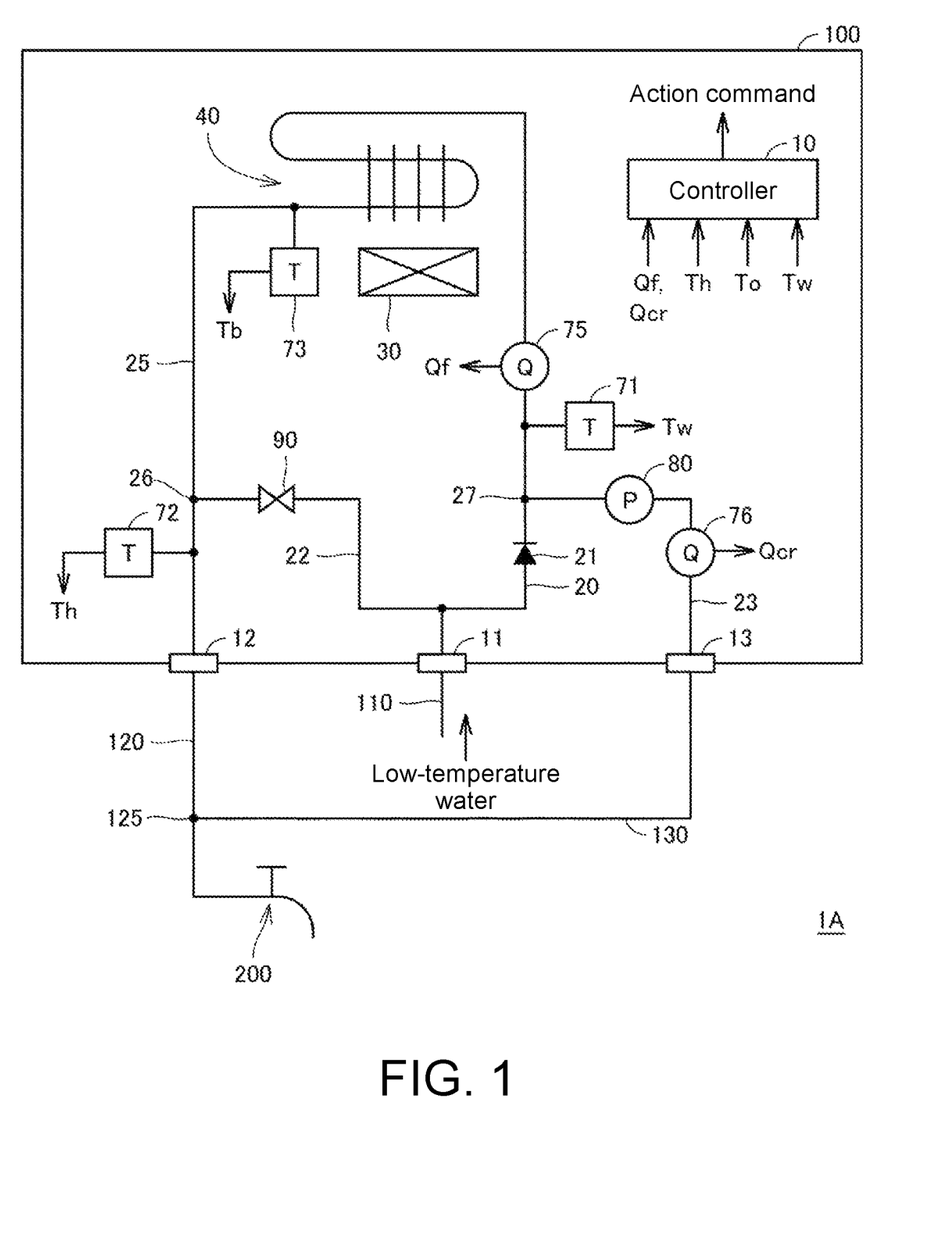
FIG. 1 is a block diagram illustrating a configuration of a hot water supply system including a hot water supply device according to an embodiment.

FIG. 1 is a block diagram illustrating a configuration of a hot water supply system 1A including a hot water supply device according to this embodiment.

Referring to FIG. 1, the hot water supply system 1A includes a hot water supply device 100, a low-temperature water pipe 110, a high-temperature water pipe 120 and a circulation pipe 130. The hot water supply device 100 includes a water inlet port 11, a hot water outlet port 12, and a circulation port 13.

Low-temperature water is supplied to the low-temperature water pipe 110. The low-temperature water is typically supplied from a water pipe (not shown). The low-temperature water pipe 110 is connected to the water inlet port 11 of the hot water supply device 100. The high-temperature water pipe 120 is connected between the hot water outlet port 12 of the hot water supply device 100 and a hot water supply tap 200. The circulation pipe 130 branches from the high-temperature water pipe 120 and is connected to the circulation port 13 of the hot water supply device 100.

The hot water supply device 100 includes a controller 10, a water inlet path 20, a check valve 21, a bypass path 22, a circulation path 23, a hot water outlet path 25, a combustion mechanism 30, a heat exchanger 40, a circulation pump 80, and a flow rate regulation valve 90.

The water inlet path 20 is formed between the water inlet port 11 and an input side (upstream side) of the heat exchanger 40 via the check valve 21. The combustion mechanism 30 is typically composed of a burner that generates heat by burning gas, petroleum, or the like.

The heat exchanger 40 uses heat generated by the combustion mechanism 30 to heat the low-temperature water (fluid) introduced through the water inlet path 20 to raise the temperature. The combustion mechanism 30 and the heat exchanger 40 constitute an example of "heating mechanism".

The hot water outlet path 25 is formed between an output side (downstream side) of the heat exchanger 40 and the hot water outlet port 12. The bypass path 22 connects between the water inlet path 20 and the hot water outlet path 25 without going through the heat exchanger 40. By controlling the flow rate regulation valve 90 by the controller 10, the ratio of the flow rate of the bypass path 22 (bypass flow rate) to the total flow rate (the sum of the flow rate of the heat exchanger 40 and the flow rate of the bypass path 22) may be adjusted.

In such a bypass configuration, a portion of the low-temperature water bypasses the heat exchanger 40 and remains unheated and is mixed downstream of the heat exchanger 40 such that high-temperature water is supplied from the hot water outlet port 12. As a result, the output temperature from the heat exchanger 40 (heating mechanism) may be increased, which is advantageous in suppressing drainage caused by cooling the exhaust gas from the combustion mechanism 30 on the surface of the heat exchanger 40.

The circulation path 23 is formed between the circulation port 13 and the water inlet path (a connection point 27). The circulation pump 80 is inserted and connected to the circulation path 23. Alternatively, the circulation pump 80 may be inserted and connected to the circulation pipe 130 outside the hot water supply device 100. Actuation and stop of the circulation pump 80 are controlled by the controller 10. Moreover, a flow rate sensor 76 is arranged in the circulation path 23. The flow rate sensor 76 may be positioned between the circulation port 13 and the circulation pump 80.

A flow rate sensor 75 for outputting a flow rate value of low-temperature water is arranged in the water inlet path 20. Flow rate detection values Qf and Qcr by the flow rate sensors 75 and 76 are input to the controller 10. A temperature sensor 71 is further arranged in the water inlet path 20. The temperature sensor 71 detects a water inlet temperature Tw before being heated by the heat exchanger 40.

Temperature sensors 72 and 73 are arranged in the hot water outlet path 25. The temperature sensor 72 is arranged downstream of a connection point 26 with the bypass path 22 in the hot water outlet path 25 and detects a hot water outlet temperature Th. On the other hand, the temperature sensor 73 is arranged upstream of the connection point 26 and detects a can body temperature Tb corresponding to the output temperature from the heat exchanger 40. Each fluid temperature detected by the temperature sensors 71-73 is input to the controller 10.

Figure 2:
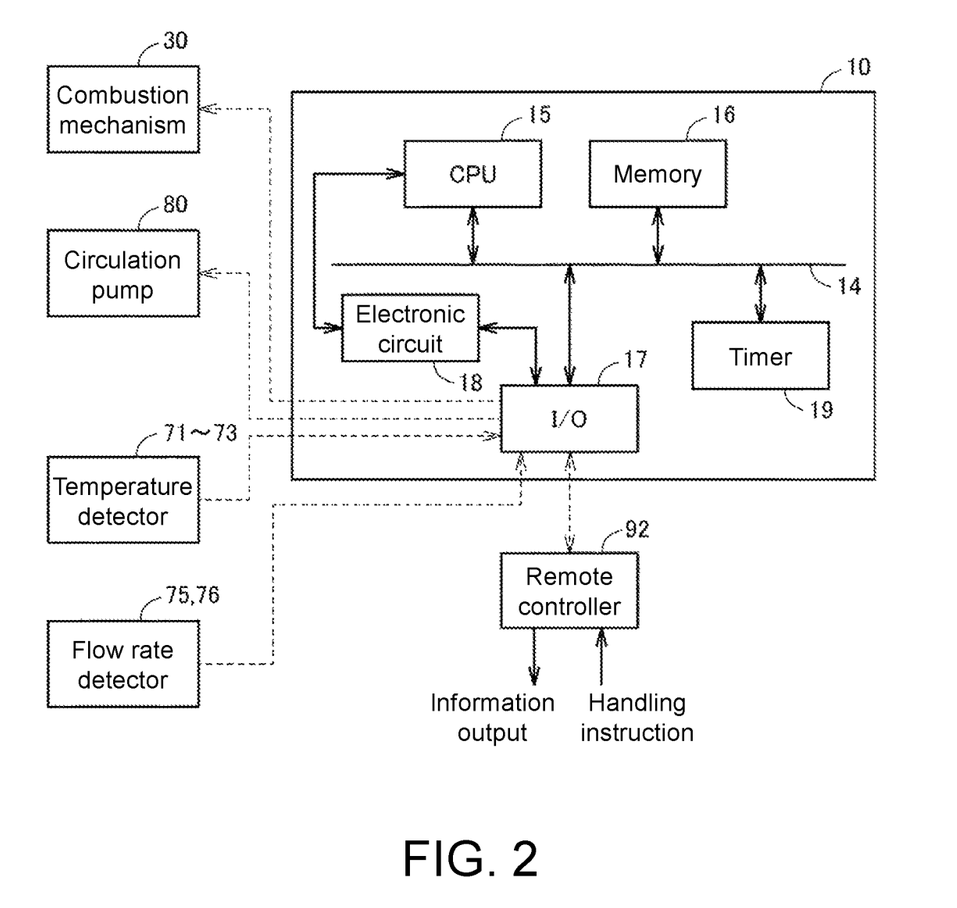
FIG. 2 is a block diagram illustrating an example of hardware configuration of the controller shown in FIG. 1.

FIG. 2 is a block diagram illustrating an example of hardware configuration of the controller 10.

Referring to FIG. 2, the controller 10 is typically composed of a microcomputer. The controller 10 includes a CPU (Central Processing Unit) 15, a memory 16, an input/output (I/O) circuit 17, and an electronic circuit 18. The CPU 15, the memory 16, and the I/O circuit 17 may exchange signals with each other via a bus 14. The electronic circuit 18 is configured to execute given arithmetic processing by dedicated hardware. The electronic circuit 18 may exchange signals with the CPU 15 and the I/O circuit 17.

The CPU 15 receives output signals (detection values) from sensors including the temperature sensors 71-73 and the flow rate sensors 75 and 76 through the I/O circuit 17. Furthermore, the CPU 15 receives through the I/O circuit 17 a signal indicating a handling instruction input to a remote controller 92. The handling instruction include, for example, turning ON/OFF the operation switch of the hot water supply device 100, a hot water supply setting temperature, and various reservation time settings (also referred to as "timer settings"). The CPU generates an action command for controlling each component including the combustion mechanism 30 and the circulation pump 80 such that the hot water supply device 100 acts according to the handling instruction. It is also possible to output information to a user using a display screen and a speaker (not shown) provided on the remote controller 92.

Referring to FIG. 1 again, the action of the hot water supply device 100 will be described.

During hot water supply operation in which the hot water supply tap 200 is opened, the low-temperature water is introduced into the water inlet path 20 by the supply pressure of the low-temperature water. When the flow rate sensor 75 detects a flow rate exceeding a minimum actuation flow rate (MOQ) while the operation switch of the hot water supply device 100 is ON, the controller 10 actuates the combustion mechanism 30.

As a result, the high-temperature water heated by the combustion mechanism 30 and the heat exchanger 40 is mixed with the low-temperature water passing through the bypass path 22, and then is output from the high-temperature water pipe 120 to the hot water supply tap 200 via the hot water outlet port 12. The hot water supply tap 200 is shown as a representative example of the "hot water supply destination" of the hot water supply device 100. The hot water supply destination may include an electromagnetic valve that turns ON/OFF hot water supply to a bathtub or the like, and is not limited to one that is directly opened/closed by the user.

During regular hot water supply operation, the controller 10 stops the circulation pump 80 and controls the fluid temperature (the hot water outlet temperature Th) detected by the temperature sensor 72 to a hot water supply setting temperature Tr input to the remote controller 92. Specifically, the hot water outlet temperature may be controlled by a combination of the control of heating amount (heat generated) by the combustion mechanism 30 (heating mechanism) and the control of the bypass flow rate ratio by the flow rate regulation valve 90.

For example, heat Pset (per unit time) to be generated by the combustion mechanism 30 may be set according to the following formula (1). K in Formula (1) is a conversion coefficient to heat.

$$Pset = k \times Qf \times (Tr - Tw) \quad (1)$$

Furthermore, the bypass flow rate ratio by the flow rate regulation valve 90 may be adjusted by feedback control based on the difference between the hot water outlet temperature Th and the hot water supply setting temperature Tr.

When the hot water supply operation is stopped, since the fluid temperature staying in the hot water outlet path 25 and the high-temperature water pipe 120 drops, there is a concern that it will take time to supply hot water at an appropriate temperature to the hot water supply tap 200 after the next hot water supply operation is started. Thus, the hot water supply device 100 is provided with an instantaneous hot water operation function for quickly supplying high-temperature water after the hot water supply operation is started. The instantaneous hot water operation is realized by forming an instantaneous hot water circulation path including the heat exchanger 40 (heating mechanism) by actuating the circulation pump 80 while hot water supply is stopped at the hot water supply destination by closing the hot water supply tap 200 or the like.

The instantaneous hot water circulation path consists of a loop from the circulation port 13 through the circulation path 23, the water inlet path 20 (downstream of the connection point 27), the heat exchanger 40, the hot water outlet path 25, the hot water outlet port 12, and the high-temperature water pipe 120 (a connection point 125 upstream), and returns to the circulation port 13 via the circulation pipe 130. Of the loop, the portion inside the hot water supply device 100 corresponds to an example of "internal path", and the portion outside the hot water supply device 100 including the circulation pipe 130 corresponds to an example of "external path". Moreover, in the example of FIG. 1, the hot water outlet port 12 and the circulation port 13 correspond to an embodiment of "two ports" through which the fluid in the instantaneous hot water circulation path passes.

When the instantaneous hot water circulation path is formed by the actuation of the circulation pump 80, the flow rate detection value Qf of the flow rate sensor 75 exceeds the MOQ, thereby the combustion mechanism 30 is actuated. As a result, the hot water in the instantaneous hot water circulation path is heated.

In the configuration of FIG. 1, it is understood that the temperature sensors 71-73 and the flow rate sensors 75 and 76 are arranged in the instantaneous hot water circulation path. The flow rate sensors 75 and 76 thus correspond to an embodiment of a "flow rate detector". The temperature sensors 71-73 correspond to one embodiment of a "temperature detector", but an embodiment in which the temperature sensor 72 is the "temperature detector" will be described. Moreover, the flow rates detected by the flow rate sensors 75 and 76 are the same during the instantaneous hot water operation, but in this specification, an embodiment in which the flow rate sensor 75 is the "flow rate detector" will be described.

When the hot water supply tap 200 is opened during the instantaneous hot water operation, the instantaneous hot water operation is ceased, and the hot water supply operation is started with the stop of the circulation pump 80. Moreover, when the hot water supply tap 200 is opened, the flow rate detection value Qf by the flow rate sensor 75 (the water inlet path 20) increases with respect to the flow rate detection value Qcr by the flow rate sensor 76 (the circulation path 23). Thus, the controller 10 may monitor whether the hot water supply tap 200 is closed or open by comparing the difference (Qf−Qcr) between the flow rate detection values Qf and Qcr with a predetermined determination value during the instantaneous hot water operation.

Figure 3:
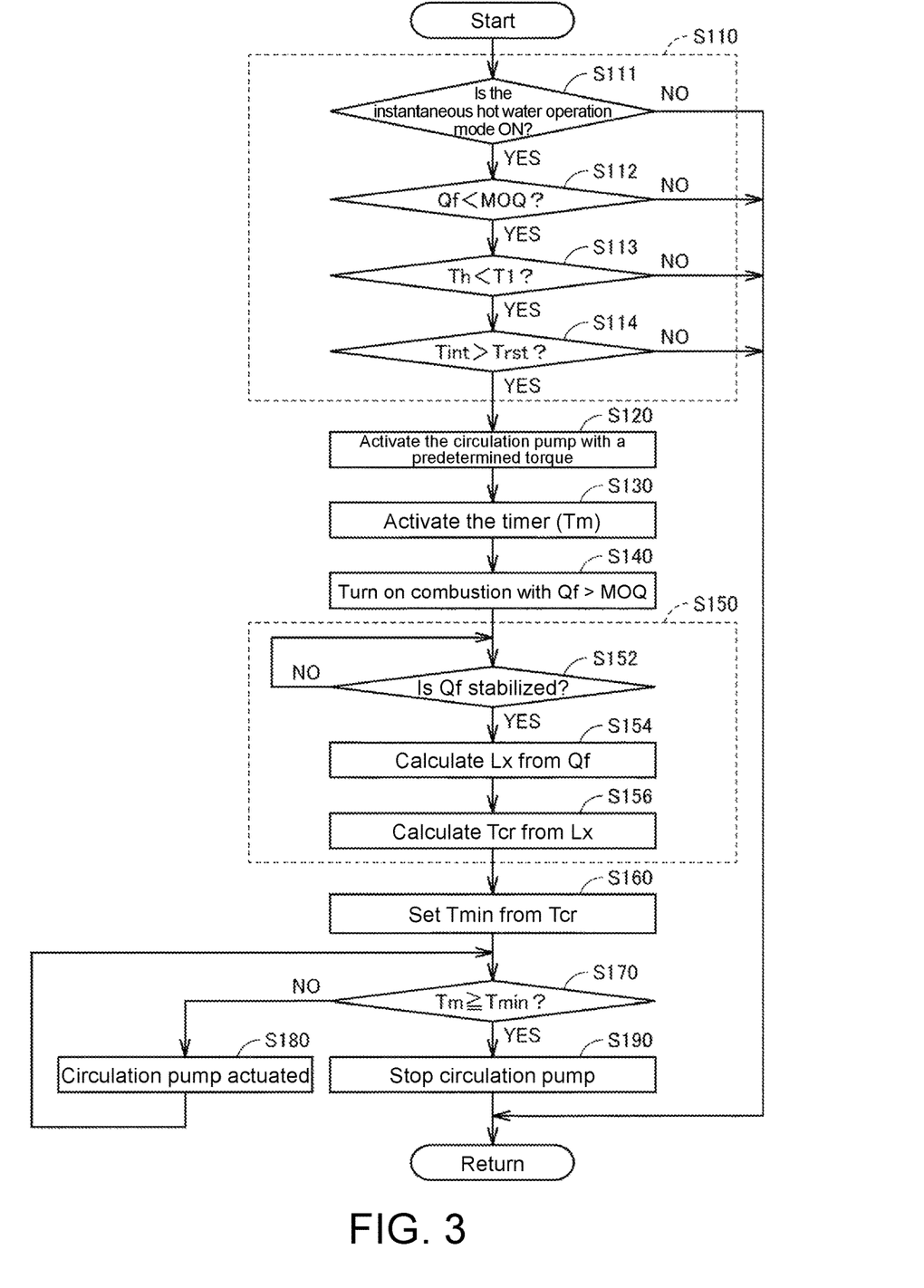
FIG. 3 is a flowchart illustrating a control processing of instantaneous hot water operation by the hot water supply device according to embodiment 1.

FIG. 3 is a flowchart illustrating a control processing of instantaneous hot water operation by the hot water supply device according to embodiment 1. The control processing shown in FIG. 3 is repeatedly activated by the controller 10 when the hot water supply operation is stopped.

Referring to FIG. 3, the controller 10 determines start condition for instantaneous hot water operation at step (hereinafter simply referred to as "S") 110. S110 includes S111 to S114.

In S111, whether or not the instantaneous hot water operation mode is ON is determined. The instantaneous hot water operation mode is turned ON and OFF in response to handling of switch by the user, for example. Alternatively, the ON period of the instantaneous hot water operation mode may be provided by timer setting by the user or learning of the past history. In S111, it is determined as YES when the instantaneous hot water operation mode is ON, while it is determined as NO when it is OFF.

In S112, whether or not hot water supply is stopped by comparing the flow rate detection values Qf and MOQ. If Qf<MOQ due to closing of the hot water supply tap 200 or the like, it is determined as YES in S112, and it is determined that hot water supply is stopped. On the contrary, it is determined as NO in S112 when hot water or cold water is output from the hot water supply device 100 and the flow rate detection value is Qf MOQ.

In S113, the detection value of the fluid temperature in the instantaneous hot water circulation path, for example, the hot water outlet temperature Th, which is the detection value of temperature by the temperature sensor 72, is compared with a determination temperature T1. The determination temperature T1 is set to be α [° C.] lower than the hot water supply setting temperature Tr (T1=Tr−α). For example, a may be set to about 10 [° C.]. In S113, it is determined as YES when Th<T1, while it is determined as NO when Th≥T1. The determination temperature T1 corresponds to the "first determination temperature".

In S114, an interval time Tint of the instantaneous hot water operation, that is, the elapsed time from the termination of the previous instantaneous hot water operation is compared with a determination time Trst. Trst may be set to, for example, about 10 minutes. In S114, it is determined as YES when Tint>Trst, while it is determined as NO when Tint≤Trst.

When it is determined as YES in all of S111 to S114, the controller 10 makes a determination of YES in S110 and starts the instantaneous hot water operation. On the other hand, it is determined as NO in any one of S111 to S114, it is determined as NO in S110 and the instantaneous hot water operation is not started.

When the instantaneous hot water operation is started, the controller 10 activates the circulation pump 80 in S120. The output (driving torque) of the circulation pump 80 is a predetermined constant value. Furthermore, in S130, a timer 19 for measuring an actuation time Tm of the circulation pump 80 is activated. When the instantaneous hot water circulation path is formed by the actuation of the circulation pump 80, the controller 10 actuates the heating mechanism in response to the flow rate detection value Qf exceeding the MOQ (S140). For example, the burner is turned ON to start heating.

After the circulation pump 80 is actuated, the controller 10 executes S150 for calculating the time required for the fluid to make one round in the instantaneous hot water circulation path of the hot water supply device 100 (required circulation time Tcr) based on the flow rate detection value Qf of the flow rate sensor 75 while the circulation pump 80 is actuated at a predetermined constant output. S150 includes S152, S154 and S156.

It should be noted that S150 need not be executed each time the instantaneous hot water operation is started, and once the required circulation time Tcr is obtained by S150, execution of S150 may be omitted thereafter. Alternatively, it is possible to re-execute S150 in conjunction with the start of the instantaneous hot water operation every time a certain period of time elapses or every time the instantaneous hot water operation is executed a certain number of times.

In S152, the controller 10 determines whether or not the flow rate detection value Qf has stabilized while the circulation pump 80 is actuated at a constant output. For example, if the difference between the maximum value and the minimum value of the flow rate detection value Qf within a certain period of time becomes equal to or less than a given value, it is determined as YES in S152.

When the flow rate detection value Qf is stabilized (determination as YES in S152), the controller 10 calculates a path length estimation value Lx of the instantaneous hot water circulation path of the hot water supply device 100 from the flow rate detection value Qf in S154. Furthermore, in S156, the required circulation time Tcr is calculated from the path length estimation value Lx calculated in S154.

Here, with reference with FIGS. 4 and 5, the calculation of the path length estimation value of the instantaneous hot water circulation path and the calculation of the required time for one round in S150 will be described in detail.

Assuming that the diameters of the pipes forming the instantaneous hot water circulation path are the same, the pressure loss due to the pipes is proportional to the pipe length when the output (driving torque) of the circulation pump 80 is constant.

Figure 4:
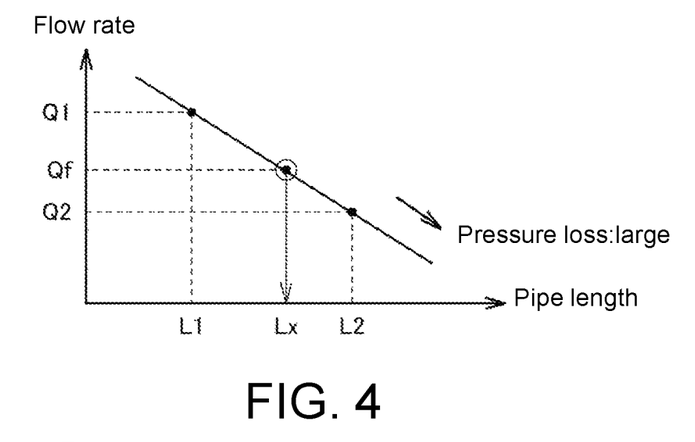
FIG. 4 is a conceptual diagram illustrating a calculation processing of a path length estimation value of an instantaneous hot water circulation path.

Thus, as shown in FIG. 4, on a circulation path with a specified pipe diameter a[m] and total pipe length (i.e. the path length) is known, two flow rate detection values are stored in advance when the circulation pump 80 is actuated at a predetermined output torque TR1 [N·m].

Specifically, data indicating a flow rate value Q1 [L/min] in a circulation path with a path length L1 [m] and a flow rate value Q2 [L/min] in a circulation path with a path length L2 [m] are stored in the controller 10 in advance. The flow rate values Q1 and Q2 may be obtained in advance through an on-site practical experiments using a circulation path with the same pipe diameter, and data indicating the experimental results may be written into the controller 10 at the stage of factory shipment.

In S154, by linear interpolation for (L1, Q1) and (L2, Q2) in FIG. 4, using the stabilized flow rate detection value Qf in S152, the path length estimation value Lx of the instantaneous hot water circulation path in the hot water supply device 100 may be calculated. For example, according to FIG. 4, the path length estimation value Lx may be calculated from Q1, Q2, L1, and L2 by the following equation (2).

$$Lx = L1 + (Qf - Q1) \cdot (L1 - L2)/(Q1 - Q2) \quad (2)$$

Equation (2) is divided into a term having Qf as a variable and a constant term not depending on Qf and is expressed by Equation (3).

$$LX = A \cdot QF + B \quad (3)$$

$$A = (L1 - L2)/(Q1 - Q2)$$

$$B = L1 - Q1 \cdot (L1 - L2)/(Q1 - Q2)$$

Since the volume through which the fluid in the instantaneous hot water circulation path passes is $V = (\pi \cdot a^2/4) \cdot Lx$, with the flow rate detection value Qf, the time required for the fluid to make one round of the instantaneous hot water circulation path may be obtained by V/Qf.

Figure 5:
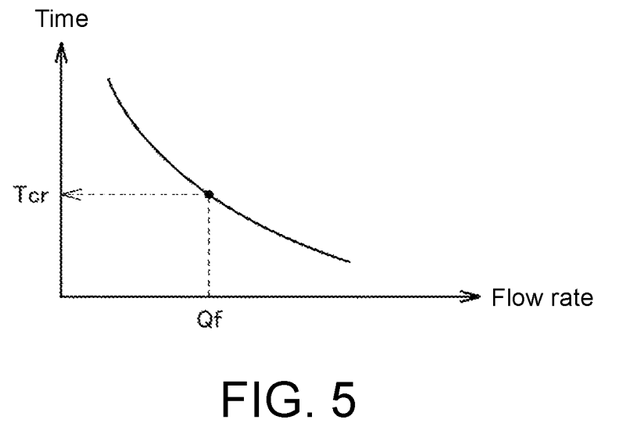
FIG. 5 is a conceptual diagram illustrating a relationship between a flow rate detection value and required circulation time.

Thus, as shown in FIG. 5, the required circulation time Tcr is inversely proportional to the flow rate detection value Qf [L/min], which may be specifically obtained by substituting Qf [L/min] into the following formula (4) using A and B in formula (3).

$$Tcr=(\pi \cdot a^2/4) \cdot Lx[\text{L/min}]/(Qf \cdot 0.001[\text{m}^3/\text{L}])=250\pi \cdot a^2 \cdot (B/Qf+A) \quad (4)$$

Referring to FIG. 3 again, the controller 10 sets a minimum drive time Tmin, which is a termination determination value related to the actuation time Tm of the circulation pump 80, in S160 according to the required circulation time Tcr calculated in S150. In S170, during the instantaneous hot water operation, the controller 10 compares the actuation time Tm measured by the timer 19 with the minimum drive time Tmin set in S160.

Until the actuation time Tm reaches the minimum drive time Tmin (determined as NO in S170), the actuation of the circulation pump 80 is maintained in S180 and the instantaneous hot water operation is continued. On the other hand, when the actuation time Tm reaches the minimum drive time Tmin (determined as YES in S170), the circulation pump 80 is stopped in S190. Accordingly, when the flow rate detection value Qf drops below the MOQ, the combustion mechanism 30 is also stopped. As a result, the instantaneous hot water operation is terminated.

The minimum drive time Tmin may be set, for example, to be equal to the required circulation time Tcr. In this manner, fluid in substantially the entire area of the instantaneous hot water circulation path may be heated without wasting heating energy. Alternatively, if the minimum drive time Tmin is set in the region of Tmin<Tcr with the required circulation time Tcr as a reference, it is possible to realize the instantaneous hot water operation in the ecology mode as in Patent Literature 1.

Moreover, during the instantaneous hot water operation, the controller 10 monitors the hot water supply tap 200 based on (Qf−Qcr) in parallel with the above processing of S120-S190, and when the opening of the hot water tap 200 (start of hot water supply) is detected by the increase in (Qf−Qcr), the processing proceeds to S190 by interruption processing, thereby terminating the instantaneous hot water operation.

In this way, according to the hot water supply device of the embodiment 1, by estimating the time required for the fluid in the instantaneous hot water circulation path formed by the actuation of the circulation pump 80 to make one round from the flow rate detection value, it is possible to appropriately set termination condition for the instantaneous hot water operation without executing the instantaneous hot water operation during trial operation.

Moreover, in S150 of FIG. 3, although an example of arithmetic processing by linear interpolation for the path lengths L1 and L2 has been described from the relationship between the flow rate detection value Qf and the flow rate values Q1 and Q2 by storing in advance two known flow rate values (Q1, Q2) under the same condition of the circulation pump 80 with the same pipe diameter as the instantaneous hot water circulation path and with the two known path lengths (L1, L2), the calculation of the path length estimation value Lx is not limited thereto. For example, it is possible to create in advance a lookup table or arithmetic expression for directly calculating the path length estimation value Lx from the flow rate detection value Qf (S152) when the circulation pump 80 is actuated at the output torque TR1 [Nm] in the instantaneous hot water circulation path with same pipe diameter based on on-site practical experiments, and in S150, use the lookup table or the arithmetic expression to calculate the path length estimation value Lx. Moreover, in the configuration example of FIG. 1, it is also possible to use the flow rate detection value Qcr of the flow rate sensor 76 to calculate the path length estimation value Lx and the required circulation time Tcr.

Embodiment 2

As described in the embodiment 1, when the instantaneous hot water circulation path is long, the flow rate in the instantaneous hot water operation becomes small due to pressure loss. On the other hand, the heating mechanism has a minimum heating amount that may be stably generated. For example, in the burner constituting the combustion mechanism 30, there is a certain lower limit for the fuel combustion amount that may maintain the combustion in a stable state, but the heating amount of the fluid during fuel combustion at this lower limit is equivalent to the above-mentioned minimum heating amount.

Such instantaneous hot water operation at low flow rates may make it difficult to heat the fluid continuously. In embodiment 2, a control combined with intermittent heating will be described in order to cope with such a case.

Figure 6:
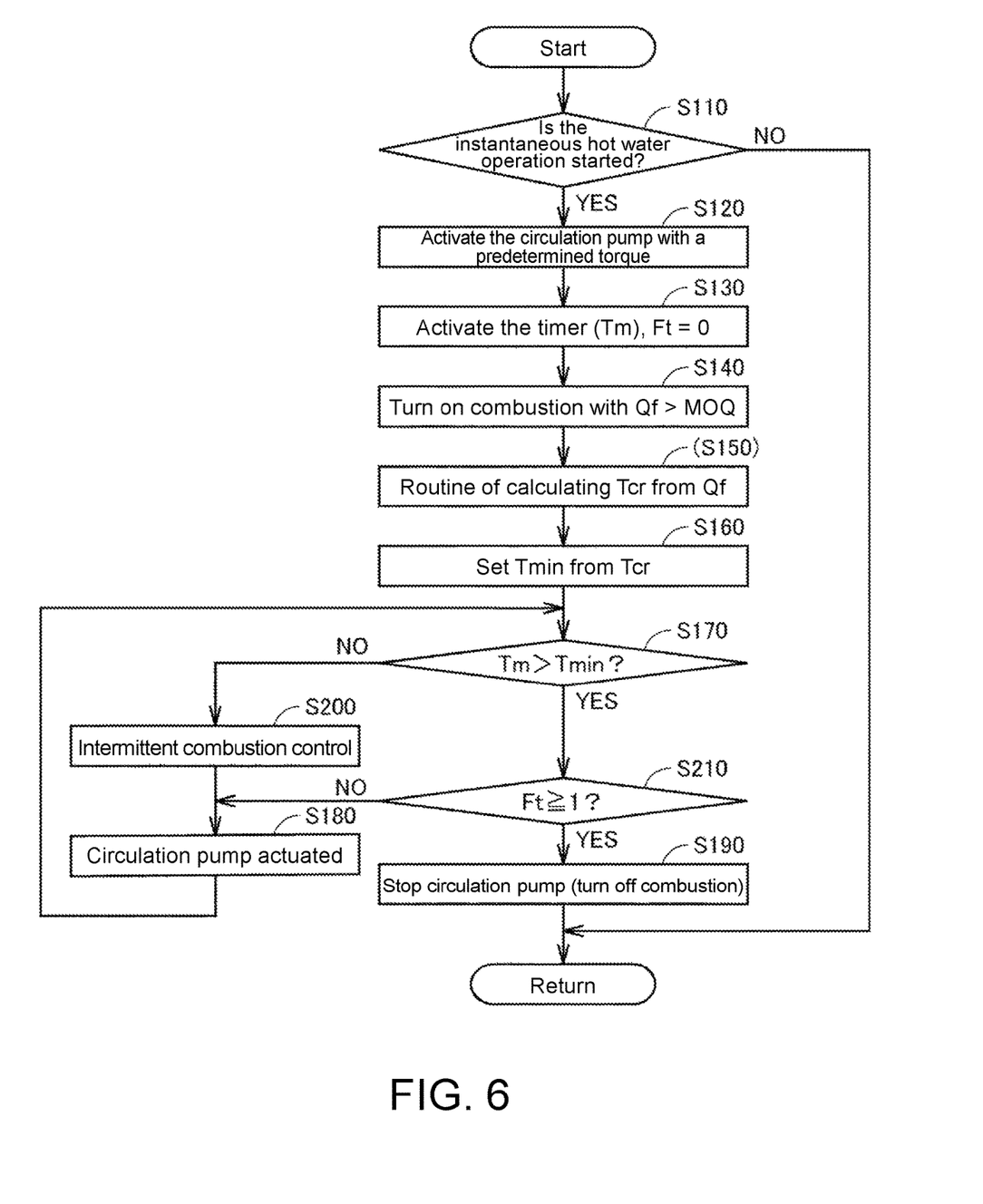
FIG. 6 is a flowchart illustrating a control processing for instantaneous hot water operation by the hot water supply device according to embodiment 2.

FIG. 6 is a flowchart illustrating a control processing for instantaneous hot water operation by the hot water supply device according to the embodiment 2. The control processing shown in FIG. 6 is also activated by the controller 10 when the instantaneous hot water operation is stopped.

Referring to FIG. 6, the controller 10 determines that the start condition for the instantaneous hot water operation is established in S110, which is the same as that in FIG. 3. When the start condition is established (determined as YES in S110), the circulation pump 80 is activated in S120 and S130, which are the same as that in FIG. 3, and the timer 19 for measuring the actuation time Tm of the circulation pump 80 is activated. Furthermore, in the embodiment 2, a flag Ft is introduced to indicate the history of temperature rise in instantaneous hot water operation. At the start of the instantaneous hot water operation, the flag Ft is initialized to 0 in S130, for example.

As in FIG. 3, the controller 10 actuates the heating mechanism in response to the flow rate detection value Qf of the instantaneous hot water circulation path exceeding the MOQ according to the actuation of the circulation pump 80 (S140). Furthermore, if necessary, S150 as in FIG. 3 is executed to calculate the required circulation time Tcr of the instantaneous hot water circulation path of the hot water supply device 100. At the start of the instantaneous hot water operation, the minimum drive time Tmin is set in S160, which is the same as in FIG. 3, in the same manner as in the embodiment 1.

Until the actuation time Tm reaches the minimum drive time Tmin (determined as NO in S170), based on the intermittent heating control in S200, the controller 10 continues the instantaneous hot water operation by maintaining the actuation of the circulation pump 80 (S180).

Figure 7:
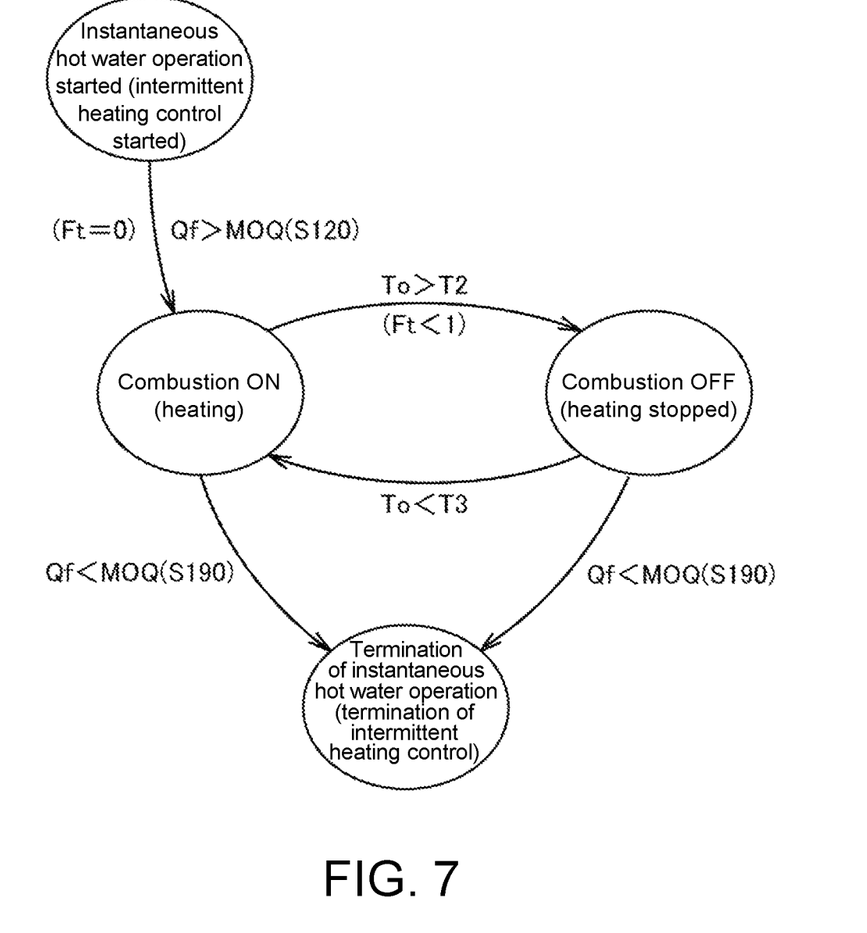
FIG. 7 is a state transition diagram illustrating intermittent heating control.

FIG. 7 is a state transition diagram illustrating intermittent heating control in S200.

Referring to FIG. 7, in the intermittent heating control, with the initial setting of the flag Ft=0 at the start of instantaneous hot water operation, the combustion by the combustion mechanism 30 is turned ON in response to the flow rate detection value Qf exceeding the MOQ. That is, the heating mechanism is in the "heating" state.

When combustion is ON, when the detection value of the fluid temperature in the instantaneous hot water circulation path, for example the detection value of temperature by the temperature sensor 72 (the hot water outlet temperature Th), rises above a determination temperature T2 set higher than the determination temperature T1 (T2>T1), the flag Ft is set to 1, the combustion by the combustion mechanism 30 is turned OFF, and the heating mechanism enters the "heating stop" state. For example, the determination temperature T2 may be set higher than the hot water supply setting temperature Tr, and if $T2=Tr+\beta$, $\beta$ may be set to about 3[° C.]. However, with $\beta<0$, the determination temperature T2 may be set lower than the hot water supply setting temperature Tr. The determination temperature T2 corresponds to the "second determination temperature".

For example, when the heat to be generated from the combustion mechanism 30, which is set according to the formula (1) based on the water inlet temperature Tw and the flow rate detection value Qf, is smaller than the above-described minimum heat of the combustion mechanism 30, continuing heating with the minimum heat may cause a case where Th>T2.

On the other hand, after the transition from combustion ON to combustion OFF, when the detection value of fluid temperature in the instantaneous hot water circulation path, for example the detection value of temperature by the temperature sensor 72 (the hot water outlet temperature Th), drops below a determination temperature T3 (T3<T2), which is set lower than the determination temperature T2, combustion is turned ON again, that is, the combustion mechanism 30 is actuated. At this time, the flag Ft is maintained at "1". That is, the flag Ft is initialized to "0" at the start of the instantaneous hot water operation where Th<T1 (T1=Tr−α), and once the temperature rises to Th>T2 (T2=Tr+β), it is aintained at "1" until the termination of instantaneous hot water operation.

For example, the determination temperature T3 may be set to a temperature that is lower than the hot water supply setting temperature Tr and higher than the determination temperature T1 under the start condition for the instantaneous hot water operation. However, the determination temperature T3 may be set equal to or higher than the hot water supply setting temperature Tr, or may be set equal to or lower than the determination temperature T1. The determination temperature T3 corresponds to the "third determination temperature".

In this way, by applying the intermittent heating control by turning the combustion of the combustion mechanism 30 ON and OFF in response to the rise and fall of the detection value of fluid temperature in the instantaneous hot water circulation path (for example, the hot water outlet temperature Th), even when the heat to be generated from the combustion mechanism 30 is smaller than the minimum heat, the instantaneous hot water operation may be continued until the actuation time Tm reaches the minimum drive time Tmin, without excessively increasing the fluid temperature.

During the intermittent heating control, when the flow rate detection value Qf drops below the MOQ due to the stop of the circulation pump 80 caused by the termination of the instantaneous hot water operation, the intermittent heating control is terminated. In this case, even if the detection value of fluid temperature in the instantaneous hot water circulation path drops, the transition from combustion OFF (heating stop) to combustion ON (heating restart) does not occur.

Referring to FIG. 6 again, the controller 10 determines the value of the flag Ft introduced by intermittent heating control in S210 when the actuation time Tm reaches the minimum drive time Tmin (determined as YES in S170). When Ft=1, that is, when there is a history in which the detection value of the fluid temperature in the instantaneous hot water circulation path (for example, the hot water outlet temperature Th) has risen to the determination temperature T2 in the current intermittent heating (determined as YES in S210), the processing proceeds to S190, and the instantaneous hot water operation is terminated by stopping the circulation pump 80.

On the other hand, when flag Ft=0 (determined as NO in S210), the actuation of the circulation pump 80 is continued by the combination of the determination of YES in S170 and the determination of NO in S210 (S180). In this case, with the intermittent heating control (FIG. 7), the instantaneous hot water operation is continued by continuing the actuation of the circulation pump 80 (S180) until there is a history in which the hot water outlet temperature Th rises to the determination temperature T2. Then, when Th>T2, by the combination of the determination of YES in S170 and the determination of YES in S210, the processing proceeds to S190, thereby terminating the instantaneous hot water operation.

Also in FIG. 6, during the instantaneous hot water operation, when the opening of the hot water supply tap 200 (the start of hot water supply) is detected due to an increase in (Qf−Qcr), the processing proceeds to S190 by interruption processing, and the instantaneous hot water operation is terminated.

In this way, according to the hot water supply device of the embodiment 2, by combining the intermittent heating control, it is possible to smoothly execute the instantaneous hot water operation according to the same termination condition as that of the embodiment 1 even at a low flow rate.

Next, a modification of the hot water supply and hot water supply system according to this embodiment will be further described.

Figure 8:
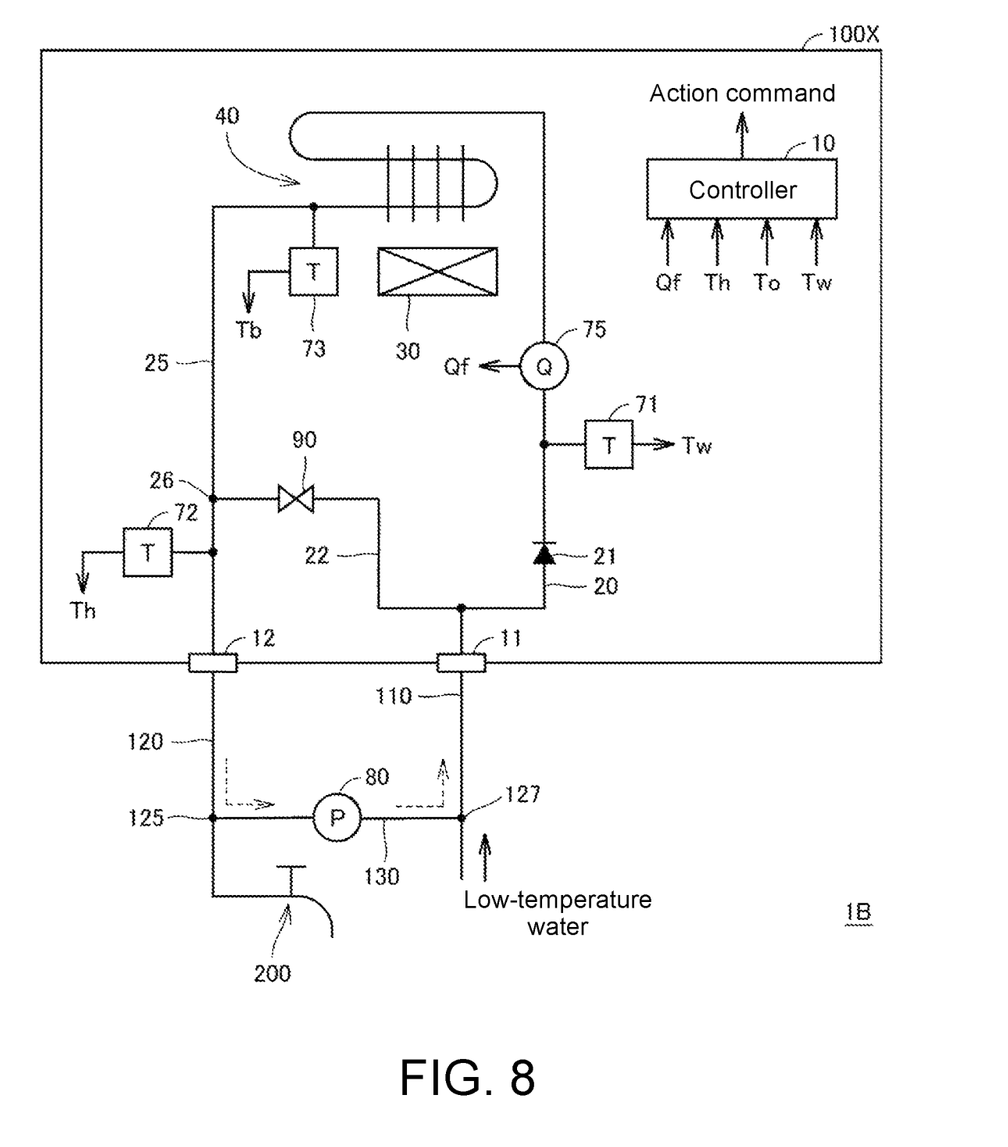
FIG. 8 is a block diagram illustrating another example of the configuration of the hot water supply device and the hot water supply system.

FIG. 8 is a block diagram illustrating a modification of the configuration of the hot water supply device and the hot water supply system according to a modification of this embodiment.

Referring to FIG. 8, a hot water supply system 1B includes a hot water supply device 100X, the low-temperature water pipe 110, the high-temperature water pipe 120, the circulation pipe 130, and the circulation pump 80. The hot water supply device 100X includes the water inlet port 11 and the hot water outlet port 12 without the circulation port 13. Accordingly, unlike the hot water supply device 100 in FIG. 1, the circulation path 23 and the flow rate sensor 76 are not provided inside the hot water supply device 100X.

The low-temperature water pipe 110 to which low-temperature water is supplied is connected to the water inlet port 11 of the hot water supply device 100X, and is also connected to the circulation pipe 130. That is, in the hot water supply system 1B, the circulation pipe 130 is connected between the low-temperature water pipe 110 and the high-temperature water pipe 120.

The circulation pump 80 is inserted and connected to the circulation pipe 130, for example. The circulation pump 80 may be arranged outside the hot water supply device 100X as illustrated in FIG. 8, or may be inserted and connected to the water inlet path 20 inside the hot water supply device 100X.

During the hot water supply operation, by stopping the circulation pump 80, a fluid path similar to that in the hot water supply device 100 in FIG. 1 may be formed inside the hot water supply device 100X. Accordingly, hot water supply operation similar to that of the hot water supply device 100 (FIG. 1) may also be performed in the hot water supply device 100X.

On the other hand, by actuating the circulation pump 80 with the flow rate regulation valve 90 closed (flow rate=0), the instantaneous hot water circulation path including the heat exchanger 40 (heating mechanism) may also be formed in the hot water supply device 100X.

Specifically, the instantaneous hot water circulation path may be configured by a loop from the water inlet port 11 through the water inlet path 20, the heat exchanger 40, the hot water outlet path 25, the hot water outlet port 12, the high-temperature water pipe 120 (upstream of the connection point 125), the circulation pipe 130, and the low-temperature water pipe 110 (downstream of a connection point 127), and returns to the water inlet port 11. In the configuration of FIG. 8, of the loop, the portion inside the hot water supply device 100X corresponds to an example of the "internal path", and the portion outside the hot water supply device 100X including the circulation pipe 130 corresponds to an example of the "external path". In the example of FIG. 8, the water inlet port 11 and the hot water outlet port 12 correspond to an embodiment of "two ports" through which the fluid of the instantaneous hot water circulation path passes.

Also in the hot water supply device 100X, the flow rate sensor 75 and the temperature sensors 71-73 are also arranged in the instantaneous hot water circulation path like the hot water supply device 100, using the flow rate detection value Qf of the instantaneous hot water circulation path, the instantaneous hot water operation to which embodiment 1 or 2 is applied may be executed.

Moreover, in the configuration example of FIG. 8, the controller 10 may monitor whether the hot water supply tap 200 is closed or open based on the behavior of the flow rate detection value Qf during the instantaneous hot water operation. That is, when the flow rate detection value Qf increases beyond a predetermined determination value while the circulation pump 80 is actuated at a constant output, the opening of the hot water supply tap 200 (start of hot water supply) may be detected, and the instantaneous hot water operation may be terminated.

Moreover, in this embodiment, the heat source in the heating mechanism is not limited to the combustion mechanism 30 that heats by fuel combustion, and any heat source may be applied.

The embodiments disclosed this time are in all to be considered illustrative and not restrictive. The scope of the disclosure is indicated by the scope of the claims rather than the above description, and is intended to include all modifications within the scope and meaning equivalent to the scope of the claims.

What is claimed is:

1. A hot water supply device for supplying hot water to a hot water supply destination, the hot water supply device comprising:
   a heating mechanism heating a fluid;
   an internal path, in combination with an external path formed between two ports of the hot water supply device outside the hot water supply device so as not to include the hot water supply destination, that forms an instantaneous hot water circulation path through which the fluid passes via the two ports and the heating mechanism in an instantaneous hot water operation executed with an actuation of a circulation pump when a temperature of the fluid drops while the hot water supply is stopped at the hot water supply destination;
   a flow rate detector arranged in the instantaneous hot water circulation path; and
   a control device that controls the circulation pump and the heating mechanism,
   wherein the control device:
   when the instantaneous hot water operation is started, until a minimum drive time set based on a flow rate detection value of the flow rate detector under a condition that the circulation pump is actuated at a predetermined constant output and the hot water circulation path is formed elapses, actuates the circulation pump at the constant output and actuates the heating mechanism.

2. The hot water supply device according to claim 1, further comprising;
   a temperature detector arranged in the instantaneous hot water circulation path,
   wherein the instantaneous hot water operation is started when a detected temperature by the temperature detector drops below a first determination temperature set lower than a hot water supply setting temperature to the hot water supply destination while the hot water supply is stopped, and
   the control device stops heating by the heating mechanism when the detected temperature rises above a second determination temperature set higher than the first determination temperature during heating by the heating mechanism while the circulation pump is actuated.

3. The hot water supply device according to claim 2, wherein the control device controls the heating mechanism such that heating of the heating mechanism is restarted when the detected temperature drops below a third determination temperature set lower than the second determination temperature during stop of the heating by the heating mechanism while the circulation pump is actuated.

4. The hot water supply device according to claim 3, wherein, in a case where the minimum drive time has elapsed since start of the instantaneous hot water operation, if there is no history of the detected temperature by the temperature detector rising to the second determination temperature during the instantaneous hot water operation, the control device continues actuating the circulation pump and the heating mechanism until the detected temperature rises to the second determination temperature.

5. The hot water supply device according to claim 3, wherein a first flow rate value and a second flow rate value, respectively in a first hot water circulation path having a first path length and a second hot water circulation path having a second path length, formed with same pipe diameter as the hot water circulation path and with the circulation pump actuated at a constant output, are stored in advance in the control device in association with the first path length and the second path length, and
   the control device calculates, from a relationship between a flow rate detection value of the flow rate detector and the first flow rate value as well as the second flow rate value under a condition in which the circulation pump is actuated at the predetermined constant output, a path length estimation value for the instantaneous hot water circulation path of the hot water supply device based on the first path length and the second path length; calculates, from the path length estimation value, a required circulation time for the fluid to make one round in the instantaneous hot water circulation path under the condition; and sets the minimum drive time according to the calculated required circulation time.

6. The hot water supply device according to claim 2, wherein, in a case where the minimum drive time has elapsed since start of the instantaneous hot water operation, if there is no history of the detected temperature by the temperature detector rising to the second determination temperature during the instantaneous hot water operation, the control device continues actuating the circulation pump and the heating mechanism until the detected temperature rises to the second determination temperature.

7. The hot water supply device according to claim 2, wherein a first flow rate value and a second flow rate value, respectively in a first hot water circulation path having a first path length and a second hot water circulation path having a second path length, formed with same pipe diameter as the hot water circulation path and with the circulation pump actuated at a constant output, are stored in advance in the control device in association with the first path length and the second path length, and the control device calculates, from a relationship between a flow rate detection value of the flow rate detector and the first flow rate value as well as the second flow rate value under a condition in which the circulation pump is actuated at the predetermined constant output, a path length estimation value for the instantaneous hot water circulation path of the hot water supply device based on the first path length and the second path length; calculates, from the path length estimation value, a required circulation time for the fluid to make one round in the instantaneous hot water circulation path under the condition; and sets the minimum drive time according to the calculated required circulation time.

8. The hot water supply device according to claim 1, wherein a first flow rate value and a second flow rate value, respectively in a first hot water circulation path having a first path length and a second hot water circulation path having a second path length, formed with same pipe diameter as the hot water circulation path and with the circulation pump actuated at a constant output, are stored in advance in the control device in association with the first path length and the second path length, and the control device calculates, from a relationship between a flow rate detection value of the flow rate detector and the first flow rate value as well as the second flow rate value under a condition in which the circulation pump is actuated at the predetermined constant output, a path length estimation value for the instantaneous hot water circulation path of the hot water supply device based on the first path length and the second path length; calculates, from the path length estimation value, a required circulation time for the fluid to make one round in the instantaneous hot water circulation path under the condition; and sets the minimum drive time according to the calculated required circulation time.

9. A hot water supply system, comprising:

a hot water supply device comprising a heating mechanism that heats a fluid;

a circulation pump actuated in an instantaneous hot water operation that is executed in response to a temperature drop in the fluid while hot water supply is stopped at a hot water supply destination of the hot water supply device;

an instantaneous hot water circulation path comprising an internal path formed between two ports of the hot water supply device such that the fluid passes through the heating mechanism inside the hot water supply device and an external path formed between the individual ports outside the hot water supply device so as not to include the hot water supply destination of the hot water supply device when the circulation pump is actuated;

a flow rate detector arranged in the instantaneous hot water circulation path;

a control device that controls the circulation pump and the heating mechanism, wherein the control device:

when the instantaneous hot water operation is started, until a minimum drive time set based on a flow rate detection value of the flow rate detector under a condition that the circulation pump is actuated at a predetermined constant output and the hot water circulation path is formed elapses, actuates the circulation pump at the constant output and actuates the heating mechanism.

* * * * *